Sept. 14, 1965 R. HARTENSTEIN ETAL 3,206,002
HIGH SPEED KICKOUT AND METHOD OF OPERATING SAME
Filed March 12, 1963 2 Sheets-Sheet 2
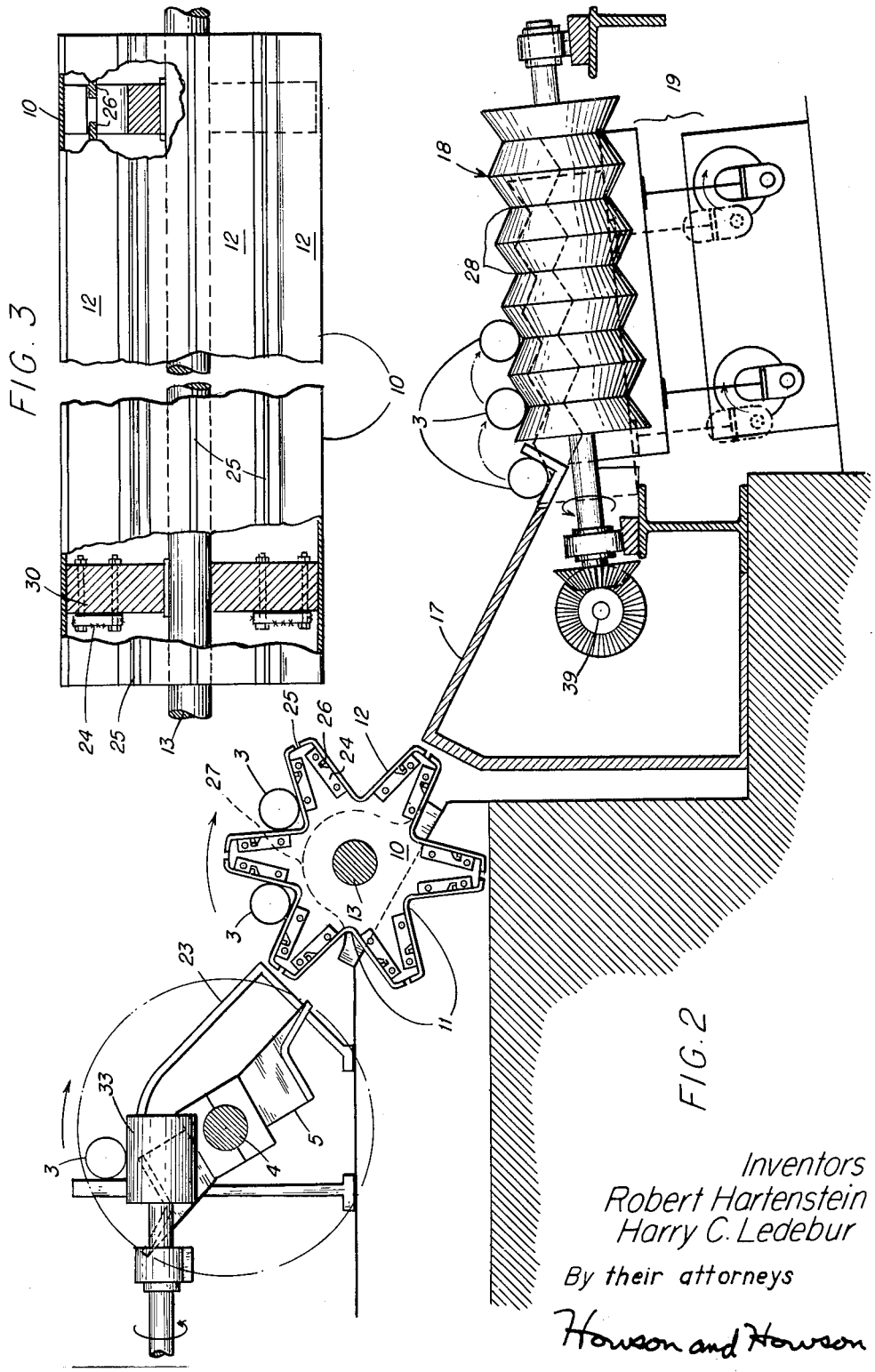
Inventors
Robert Hartenstein
Harry C. Ledebur
By their attorneys
Howson and Howson

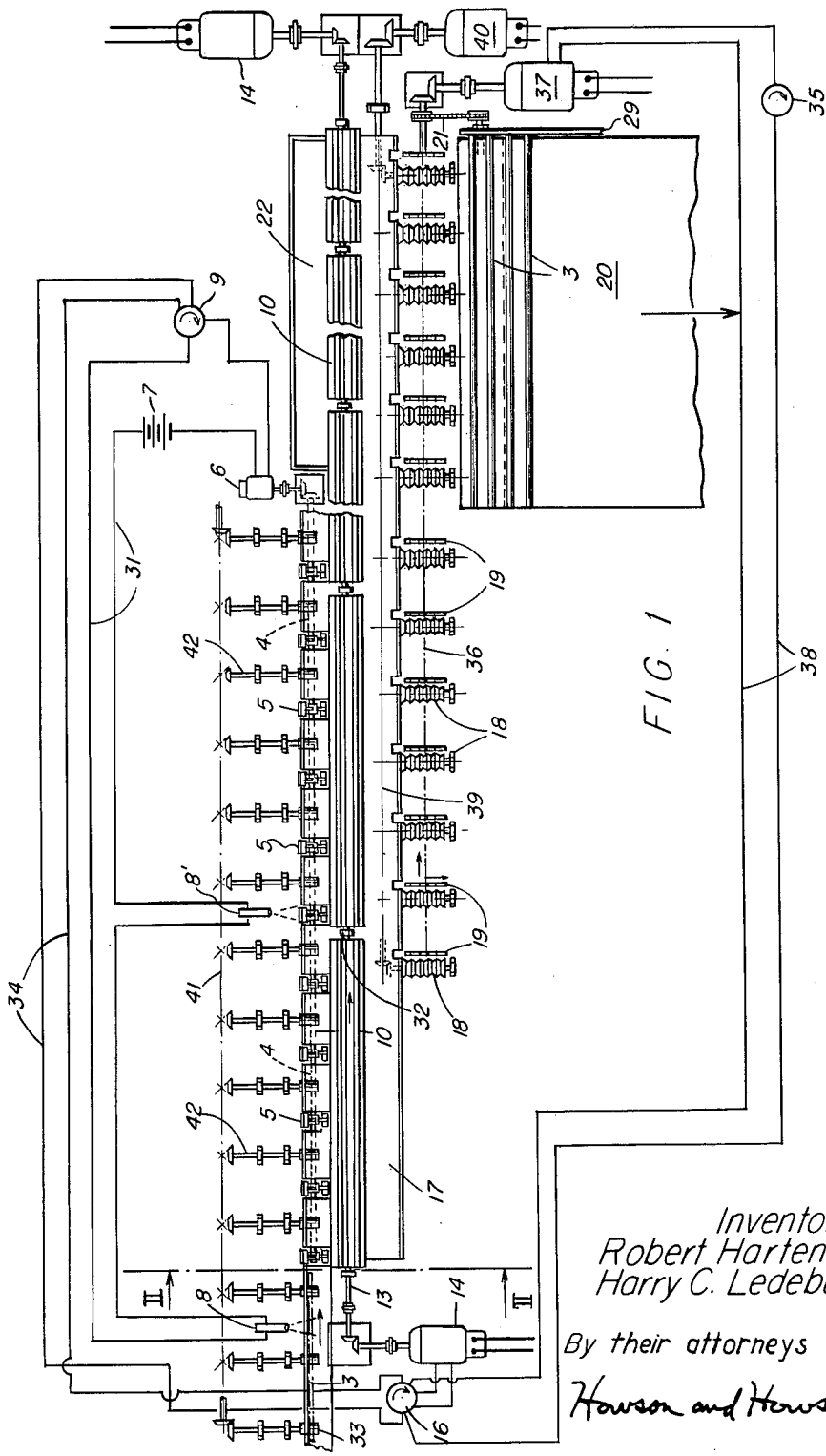

United States Patent Office 3,206,002
Patented Sept. 14, 1965

3,206,002
HIGH SPEED KICKOUT AND METHOD OF OPERATING SAME
Robert Hartenstein, Youngstown, and Harry C. Ledebur, Struthers, Ohio, assignors, by mesne assignments, to Mannesmann-Meer, A.G., Munchen-Gladbach, Germany, a German company
Filed Mar. 12, 1963, Ser. No. 264,654
6 Claims. (Cl. 198—105)

This invention relates to a high speed kickout for a mill having a conveyor to carry round mill products away in the pass line and the method of operating same, and more particularly to the handling of lengths of product coming at high speed from a rolling mill or the like in hot, deformable plastic condition, in such a way as to remove them from the pass or discharge line of the mill, stop their motion and place them on cooling means, without in any way deforming them.

It should be noted that recently mill outlet speeds have increased from an average of 600 to 1000 feet per minute to speeds in excess of 2500 feet per minute. All related equipment must match the very high mill speeds now attainable.

The product emerges from the rolling mill in a continuous or semi-continuous strand of long length, and is cut to shorter lengths as it emerges from the mill, while traveling at mill speed. These shorter lengths are carried away from the mill longitudinally in the direction of an extension of the mill pass line, on a run-out conveyor. The speed of the run-out conveyor is somewhat faster than mill speed in order that the cut lengths of product will separate endwise as they move away from the mill. Each length must then be removed sidewise from the conveyor by the kickout mechanism. This must be accomplished while the product is moving at conveyor speed, without appreciably slowing it down, so as not to interfere with the following length approaching close behind. In the process of removing the product length, the kickout mechanism itself must not block the conveyor long enough to interfere with the travel of the following length. Thus, as each length of product enters the kickout area on the conveyor, its presence is detected by a suitable detecting device, which signals the operation of the kickout, removing said length sidewise, leaving the kickout area on the conveyor free to receive the next length.

The frequency of the operation of the kickout is determined by the rate of production of cut lengths from the mill, so that for a given length the number of kickout cycles per unit of time increases directly as mill speed increases.

After removal from the conveyor by the kickout, each cut length must be slowed to a stop and accurately positioned endwise for indexing laterally onto subsequent handling equipment such as a cooling rack.

In addition, the entity of each length must be maintained throughout the process from kickout to final positioning, so that each length can be placed on the cooling rack separately and individually, in the proper sequence.

The problems of this procedure may be summarized as follows:

(1) Modern high mill speeds require extremely rapid kickout, to prevent fouling the product lengths on the run-out conveyor.

(2) Modern high mill speeds allow a very short cycle time for retaining each individual piece in each stage of deceleration and positioning.

(3) Modern high mill speeds require greater length of time for deceleration, and if this time exceeds the cycle time, more than one stage of deceleration is required.

(4) In most cases, mill speed varies with product size. Thus, account must be taken of the variation of distance traveled during deceleration and the resultant variation in the remaining final positioning.

(5) Transfer of each piece separately throughout all stages of the operation must be accomplished in such a way that there will be no permanent deformation of the product, which is in a hot deformable plastic condition.

To overcome these problems the basic idea of the present invention is to provide a high speed kickout removal of the length of product from the pass line of a mill, before it is slowed down, and to provide means to receive such leading length of product into a deceleration device, while the trailing length of product can advance and also be moved into this next step of the continuous operation of the equipment without regard to the leading length of product.

The invention is characterized by equipment which can receive the product from a powered roller mill runout conveyor and while the product is moving at conveyor speed detect the gaps thereby found between the ends of longitudinally traveling lengths of product and move a length of product to the next stage without slow down or interference with the trailing product.

As a matter of fact, in order to attain some spacing between cut lengths as they are moved at runout conveyor speeds in excess of the mill speed—which latter may be 2500 feet per minute or more. The kicked out lengths of product are received in a grooved drum assembly means which indexes twice, allowing time for deceleration, before discharging a particular length of product. The lengths are thereby brought to a stop and the longitudinally stationary lengths of product discharged from the drum assembly in a lateral direction. They are moved then laterally, successively, by means which transfers them lengthwise on rollers to an end stop at a cooling bed. The lengths of product are transferred to the cooling bed which conveys them away laterally.

This invention will be shown operating on round tubular products.

A further object of the invention is to provide means to detect crop or scrap ends of product of irregular or incorrect length and permit the same to move along the conveyor without being kicked out, to a scrap bin at the end of the conveyor, without in any way interferring with the lengths of product behind the scrap end.

A further object of the invention is to provide ease of maintenance, durability and reduction of mill "down time." Design features must be carefully considered from the point of view of deformation when the apparatus, as here, handles hot lengths of product traveling at high speed. When such lengths of product are received at temperatures above curie or the magnetic break down point magnetic slow down devices and related equipment cannot be used.

Referring to the drawings:

FIG. 1 is a view in elevation of the complete high speed kickout with product deceleration drum according to the invention, showing the transfer mechanisms and the cooling bed.

FIG. 2 is an end view in elevation of the kickout of FIG. 1 and product deceleration drum, taken along line II—II of FIG. 1, and also showing the transfer mechanisms.

FIG. 3 is a detailed view on an enlarged scale of the two ends of a drum section showing how one end of each wear plate is bolted to the spider and how the keys and slots at the other end to permit relative expansion and contraction.

The invention can operate after any mill but it will be assumed in the following description that the product of a stretch reducing mill passes a flying saw at say 2500 feet per minute for the embodiment illustrated in the drawings. The resulting cut lengths of product 3 are longitudinally conveyed along a pass line conveyor 33 at a speed higher than the mill speed to provide spaces between the lengths of product. While the length of product shown is a tube it may be any round mill product. The spaces or gaps between lengths of product are located by detection equipment such as two heat or infrared light detection cells 8, 8'. Cells of this type are known. These two cells determine whether the product is of proper length for kickout. Initial and final lengths of product in a run generally are too short to be an acceptable product. These two hot pipe detectors 8, 8' are located in the kickout zone. One is located approximately twelve feet ahead of the first kickout arm 5, and the other approximately sixty feet after the first detector. Detection of the end of a product length (the gap between lengths) by the first detector will initiate an adjustable cam limit switch 9 to which it is electrically coupled in a circuit 31 (see FIG. 1). This switch is adjustable only to compensate for varying conveyor speeds (for different size products) in order that the pipe will reach the kickout zone before kickout is initiated. The second detector indicates that the product is of proper length to be kicked out. If the second detector does not indicate the presence of the product length at the time the first detector indicates the trailing end of this length, then the product length is too short, the kickout will not function, and the length will continue on the conveyor line to a crop disposal bin 22. If there is an acceptable or correct length of product, switch 9 completes its cycle, the relay circuit is closed and a motor 6 is actuated through a power source 7 to turn shaft 4 on which are mounted the spaced kickout arms 5. These arms kick the said correct length of product laterally from the runout or pass line conveyor 33 without diminishing the longitudinal velocity of that length of product. This does not in the least interfere with or slow down either a preceding or a succeeding length of product on the conveyor. The plurality of spaced kickout arms ensures maintenance of a straight, undamaged length of product during this kickout, despite the very hot, deformable plastic condition of the length.

A short skid 23 guides the kicked out length of product into one of a plurality of axial V-grooves 11 evenly spaced around a drum assembly composed of drum sections 10 of approximately 20 foot lengths, which are removably interconnected by slip joints 32 on drive shaft 13. The drawings illustrate a drum assembly having six axial V-grooves in each drum section. The grooves are fitted with wear plates 12 fixedly attached to each drum section at one end by side angles 24, to permit uniform expansion and contraction of both drum sections and wear plates. The wear plates provide the smooth surfaces necessary to effect frictional contact with lengths of product at a plurality of points peripherally, i.e. seen in cross-section, without injury to said lengths of product. If desired there can be three points of contact although only two are shown in the drawings. As the particular length of product in question skids longitudinally in its groove it is gradually but gently and completely brought to a stop.

As shown in FIG. 2 there is an air space 25 between the outer longitudinal edge of each wear plate 12 and its neighbor which forms the next groove. This provides escape for heat accumulated inside the drum section 10. These sections are hollow, the wear plates 12 being supported in proper position by spiders 30. There is a side angle 24 bolted to each end of each wear plate in the embodiment shown in the drawings. If desired additional spiders and side angles can also be provided at points intermediate the ends of each drum section 10. Each spider is tight on the drum assembly drive shaft 13 but the manner of fastening the side angles 24 to the spiders is different at the first receiving end of the drum section from the fastening to any spiders at other points in the section. At the first end the side angle is bolted rigidly to its spider. However, the heat of the lengths of product is great and the wear plates heat up and expand during continuous mill operation much faster than the spiders 30 and shaft 13. Therefore the plates must be free to expand and contract at all other points in their length. This is done by providing a key 26 on each side angle 24. These keys snap into slots on the spiders. When not bolted to the spider as at the first or leading end the key and slot allows sufficient room for expansion and contraction. Drive motors 14, synchronized to each other, are provided at each end of the drum assembly drive shaft 13.

Initiation of rotation or indexing of the section 10 of the drum assembly is made by a cam limit switch 16 connected to the kickout by electrical circuit 34. Each time the kickout arms 5 rotate, the cam limit switch in contacted starting its delayed action leading to drum rotation. The moment at which the limit switch finishes its cycle is so related to the kickout rotation as to allow sufficient time for the product to arrive in a groove in the drum assembly before the assembly is indexed. Cam limit switch 16 actuates the synchronous drum assembly drive motors 14 which turn or index all the drum sections. They do so without windup or angular deflection thereof and maintain each axial V-groove in perfect registry with its counterpart on the next adjacent drum section so as to form continuous axial V-grooves along the length of the drum assembly. Pillow blocks 27 supporting each drive shaft joint further ensure in-line drive of the whole drum assembly. It will be noted that only one supporting member for a pillow block 27 need be removed to disconnect any one section of the drum assembly. Lengths of product received in any groove of any drum section can thus skid easily from one drum section across into another without deformation, as they decelerate. In FIG. 2 it will be observed that the kicked out length of product being described for clarity of explanation is received by a drum section in the first position of the drum section. The length of product is retained in its continuous groove while the drum assembly is indexed one notch, and discharged therefrom only upon a second indexing of the drum assembly. This design feature, positively prevents two successively kicked out lengths of product from dropping into the same continuous axial V-groove, by providing an empty continuous axial V-groove for every successively kicked out length of product. Not even during receipt of and deceleration of kicked out lengths of product can there be collision and/or deformation of the same. The continuous axial V-grooves and the wear plates provide a plurality of frictional contacts with every length of product in both the receiving and intermediate index positions, to effectively, yet gently, stop the longitudinal skidding of the length of product, without deformation. The longitudinal or main drive shaft for the pass line conveyor 33 is identified by the reference character 41 and the individual drive shafts for the individual conveyor rollers are identified with the reference character 42.

A roll down skid and stop 17 is positioned adjacent the point of discharge from the indexing drum assembly means. At the lower or stop end of the skid and stop a plurality of multiple groove transfer rollers 18 and walking beam mechanisms 19 are located alternately spaced along the length of the skid and stop with the longitudinal axes of the multiple groove transfer rollers and walking beam mechanisms parallel to the lateral direction of motion of the kickout arms. A slight inclination of the longitudinal axes of the roller and beam mechanisms are located so as to reach under, up and through the lower or stop end of the skid and stop.

As lengths of product travel longitudinally along the high speed conveyor the gaps between the lengths are detected and measured to locate proper lengths. Improper or short lengths continue to travel longitudinally, unhindered along the conveyor, and drop into a bin 22 at the end of the conveyor.

Proper lengths of product are kicked laterally from the conveyor without slowing down the longitudinal travel of the length or preceding or succeeding lengths of product. The kicked out lengths of product are thereafter received in the grooved drum assembly which completely stops the longitudinal travel of the kicked out lengths.

Each now longitudinally stationary length of product is discharged from the drum assembly upon the second indexing of the drum assembly after receipt of that length of product. The intermediate index step provides adequate time for bringing product lengths to complete longitudinal rest and at the same time provides for receipt by the drum assembly of succeeding kicked out product lengths.

The product lengths are discharged from the drum to an inclined skid and stop 17. There is no storage of product on the inclined skid and stop. As each product length is discharged from the drum against the stop, it is picked out by the walking beam mechanism of the traverse conveyor before the next cycle of the drum. In this way each product length is kept separate for indexing by the walking beam across the transfer rollers. It would be extremely difficult because of the variation in product diameter to store the product ahead of the walking beam and still be able to pick off only one at a time. This would be particularly true with small product such as one-half inch (½") pipe.

We should also note in connection with the initiation of the drum indexing, as previously described, that there is another cam limit switch 35 connected to the walking beam rotation. The purpose of this switch 35 is to delay the drum indexing for the period of the cycle where the walking beam would interfere with the product reaching the stop on the apron. Thus, the walking beam is kept in step with the drum indexing.

The walking beams are shown driven by a common drive shaft 36 though each beam may be separately driven if desired (see FIG. 1). The drive shaft 36 is driven by a motor 37 located after the last walking beam. There is a walking beam limit switch 35 in a circuit 38 from motor 37 to limit switch 16 to keep the walking in proper step with the indexing of the drum assembly. The walking beam mechanism places the length of product in the closest adjacent or first groove of the multiple grooved transfer rollers 18. (In FIG. 2, the walking beams are shown in solid lines in their mid position.) These rollers then impart to the product a motion axial to the length of product, whereby the product moves longitudinally along the length of the skid and stop. The rollers 18 are shown driven by a common drive shaft 39 though each roller may be separately driven if desired. This shaft is driven by a motor 40. The movement of the product by the rollers 18 is parallel to its direction of travel as it came along the pass line conveyor from the mill before kickout. As each length moves axially, the beam mechanisms periodically come round to pick it off the multiple grooved transfer rollers momentarily, only to place it back thereon one groove 28 laterally further outward from the skid and stop than its previous position. In this manner, room is always provided for subsequent lengths of product which are removed from the skid and stop onto the multiple grooved rollers.

A cooling bed 20 moving laterally to and synchronously with the multiple grooved transfer rollers by means of a chain and sprocket drive 21 is located adjacent the outermost ends of the last few multiple groove rollers and beam mechanisms. As lengths of product are conveyed along to these rollers the beam mechanisms pick the lengths of product off the last or outermost of the grooves 28 of the rollers 18 and deposit them on the cooling and storage bed 20 from which any further desired operation may take place. There is an end stop 29 to line the lengths up on the bed. The bed moves the products away laterally.

The embodiment of the invention just described positively ensures high speed transfer, complete deceleration, and transport to a cooling bed. It is not intended to limit the invention to precisely the elements shown here. For example, the cooling bed can be of any design, a walking beam, chain, screw, etc. The slip-in joints and pillow block supports of the drum assembly drive shaft provide ready removability of entire drum sections for maintenance, but the invention is not to be understood as limited to such features specifically. Likewise, the use of 20 foot drum section lengths is not to be construed as limiting.

From the foregoing it can be seen that the invention handles very hot lengths of product in deformable, plastic condition, and traveling at high speed, gently enough during all steps of the method, to finally set the lengths of product in storage to cool, without any deformation or damage whatever.

The process is continuous in nature and operates each step automatically and sequentially, in exact timing.

What is claimed is:

1. A high speed kickout for a mill having a conveyor to carry away hot deformable round mill product lengths moving longitudinally in the pass line of the mill at speeds up to and in excess of 28 miles per hour, comprising:
    (a) rapid acting kickout means for pushing said product lengths out of the pass line without damaging them and without substantially slowing them down, said means having a kickout position and comprising a plurality of kickout arms spaced along the conveyor, said arms being mounted to move one product length at a time out of the pass line without contacting and interfering with subsequent product lengths moving toward said kickout position,
    (b) means to receive, decelerate and stop the longitudinal travel of said product lengths after they have been kicked out of the pass line, said means comprising grooved drum assembly means having a plurality of grooves parallel to said pass line into which grooves said product lengths are gravity-guided, each groove being V-shaped to frictionally engage one of said lengths with a wedging action, the engagement being made along each length at a plurality of positions spaced apart around the lower portions of its circumference,
    (c) means for indexing the drum assembly means around its lengthwise axis to provide an empty groove for receiving each newly kicked out length before the previous length has decelerated to zero longitudinal velocity.
    (d) in combination with means for actuating the kickout means whenever there is an acceptable minimum length of product at said kickout position along the pass line of the mill.

2. A high speed kickout according to claim 1, wherein said kickout actuating means comprises means for comparing the length of a product in the pass line with a minimum reference length and for actuating the kickout according to said comparison, said means comprising an electronic circuit including two product detecting cells spaced apart a distance along the pass line according to the minimum acceptable product length, and a cam limit switch electrically energized by said cells according to the detection of a product length at the second cell along the pass line in the direction of product travel when no product length is detected at the first cell, operation of said kickout means being initiated according to the energization of said cam limit switch.

3. A hgh speed kickout according to claim 2, wherein an additional cam limit switch is operatively connected to both said kickout means and said indexing means to initate indexing of the drum after the operation of the kickout means.

4. A high speed kickout according to claim 1, wherein there are gravity-controlled transfer means adjacent the drum assembly means for moving each length of product laterally out of and away from the groove in which it rests as said drum assembly is indexed, and after each product length has longitudinally decelerated to zero velocity.

5. A high speed kickout according to claim 4, wherein said transfer means comprise
(a) a skid and stop device to laterally guide and receive each product length as it is discharged from its groove in the drum assembly, in combination with
(b) multiple groove transfer rollers associated with the skid and stop device adapted to longitudinally move lengths received from the skid and stop device, and
(c) a plurality of walking beam mechanisms for transferring the lengths from the skid and stop device to the multiple groove transfer rollers.

6. A high speed kickout according to claim 5, wherein said walking beam mechanisms are adapted to lift a single length of product from the skid and stop device on to the nearest groove of the multiple groove transfer rollers and thereafter successively to advance said length of product a groove at a time when the rollers are transporting the product longitudinally away from the skid and stop device.

References Cited by the Examiner

UNITED STATES PATENTS

| | | | |
|---|---|---|---|
| 753,293 | 3/04 | McMurty | 198—105 |
| 849,122 | 4/07 | George | 198—25 X |
| 1,310,231 | 7/19 | Ahlen et al. | 198—107 X |
| 2,838,158 | 6/58 | Kerr et al. | 198—25 X |
| 2,923,952 | 2/60 | Sawdey. | |
| 2,933,202 | 4/60 | Lanstrom et al. | |
| 3,055,245 | 9/62 | McKay. | |
| 3,058,375 | 10/62 | Peterson | 198—25 X |

SAMUEL F. COLEMAN, *Primary Examiner.*

WILLIAM B. LABORDE, *Examiner.*